United States Patent
Pearce et al.

(10) Patent No.: US 8,566,415 B2
(45) Date of Patent: Oct. 22, 2013

(54) SAFE TORQUE OFF OVER NETWORK WIRING

(75) Inventors: Robert Pearce, Bristol (GB); George B Yundt, Andover, MA (US)

(73) Assignee: Kollmorgen Corporation, Radford, VA (US)

(*) Notice: Subject to any disclaimer, the term of this patent is extended or adjusted under 35 U.S.C. 154(b) by 71 days.

(21) Appl. No.: 13/214,507

(22) Filed: Aug. 22, 2011

(65) Prior Publication Data

US 2013/0054724 A1    Feb. 28, 2013

(51) Int. Cl.
*G06F 15/16*    (2006.01)

(52) U.S. Cl.
USPC ............ 709/208; 709/203; 370/276; 370/278

(58) Field of Classification Search
USPC ........... 709/203, 208; 370/276, 278; 324/538; 388/815, 821
See application file for complete search history.

(56) References Cited

U.S. PATENT DOCUMENTS

| 5,793,754 A * | 8/1998 | Houldsworth et al. ....... 370/276 |
| 2002/0185926 A1 | 12/2002 | King et al. |
| 2003/0004686 A1 | 1/2003 | Ueno et al. |
| 2009/0200290 A1* | 8/2009 | Cardinal et al. ............. 219/488 |
| 2010/0156435 A1* | 6/2010 | Kangas ......................... 324/538 |

OTHER PUBLICATIONS

Notification of Transmittal of the International Search Report and the Written Opinion of the International Searching Authority, or the Declaration (Forms PCT/ISA/220, PCT/ISA/210, and PCT/ISA/237) dated Sep. 28, 2012 (nine (9) pages).

"Control Techniques Safe Torque Off", Emerson Industrial Automation, Jul. 4, 2010, [date achieved by Google], retrieved on line from URL: <http://www.sks.fi/download/sks_Control_Techniques_sovellusoppaat/$file/Safe%20torque%20off.pdf>, retrieved Sep. 17, 2012, (thirty-one (31) pages).

* cited by examiner

*Primary Examiner* — Frantz Jean
(74) *Attorney, Agent, or Firm* — Crowell & Moring LLP (57) ABSTRACT

Systems and methods for providing Safe Torque Off signals using communication wires used for control signaling. Single channel Safe Torque Off signals can be provided as a DC voltage or AC voltage across two sets of twisted pair wires. Alternatively, two Safe Torque Off signals can be provided using both a DC voltage and an AC voltage across the two sets of twisted pair wires.

19 Claims, 8 Drawing Sheets

SAFE TORQUE OFF OVER NETWORK WIRING

BACKGROUND OF THE INVENTION

A machine can be automated using electronic motor drives and other actuators connected together via a communication network. Control and monitoring signals pass across the network, which simplifies the machine's wiring. The electronic motor drives include motors, such as servo motors, control electronics and related electronic and electro-mechanical components, such as feedback devices, mechanical brakes, network interfaces, diagnostic devices, and the like. Overall co-ordination of the machine is typically achieved by running a control program on a master controller, which sends commands to the electronic motor drives and other actuators and similarly receives position and status information from said drives and actuators. For ease of explanation, the electronic motor drives and other actuators will be referred to herein as slave devices.

In addition to wiring conveying commands and status information between the master controller and all slave devices, it is desirable to have a separate hard-wired connection to reliably ensure no power flows to the motors to enable a state known as the Safe Torque Off (STO) state. A so-called hybrid cable, with separate signal wires for the command and status information and the STO signaling, is typically employed so that a single cable bundle is provided from the master controller to the slave device. Of course, the hybrid cable can include power wires for powering the slave devices, as well as other signal wires to support other functions.

The use of hybrid cables implies that there must be an access point in the machine to combine the network, STO signal, and other signals into the hybrid cable. The term STO access point will be used herein to refer to this access point. Since the network must pass through the STO access point, the access point includes any necessary network functions, such as a network repeater, network hub or network switch.

Figure 1:
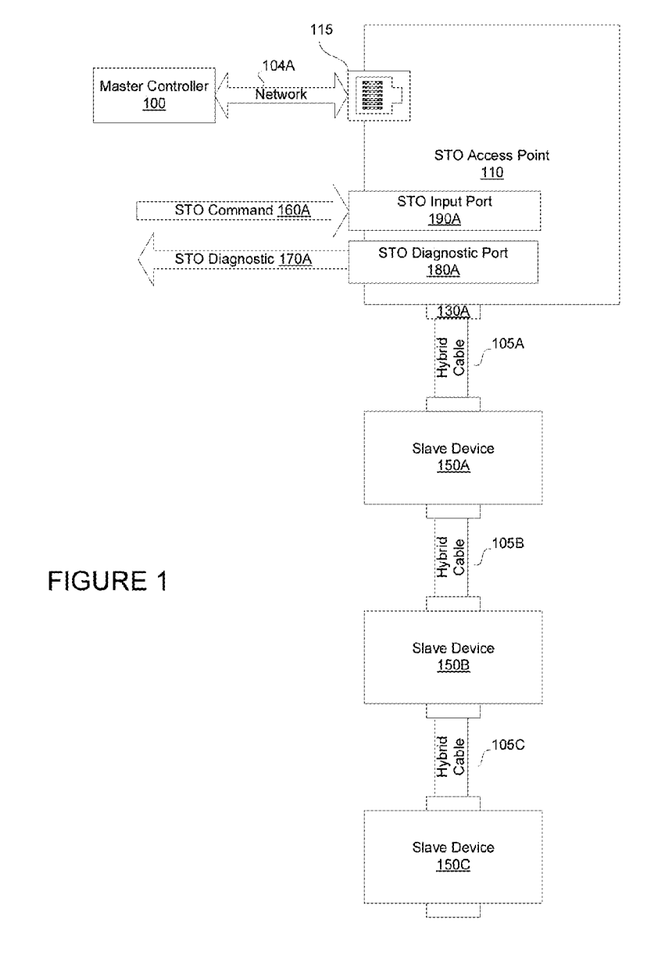
FIG. 1 is a block diagram of a conventional decentralized drive arrangement.

FIG. 1 illustrates a typical decentralized drive arrangement in which an STO access point 110 is coupled to a plurality of slave devices 150A-150C. STO access point 110 also incorporates at least one network interface 115, which allows connection to the master controller 100 and other network devices. STO access point 110 has at least one hybrid port 130A, which is directly coupled via hybrid cable 105A to slave device 150A. Slave device 150A is coupled via hybrid cable 105B to slave device 150B, which in turn is coupled via hybrid cable 105C to slave device 150C. This connection arrangement of slave devices 150A-150C is commonly referred to as a daisy-chain. STO access point 110 also includes an STO input port 190A for receiving an STO command 160A and an STO diagnostic port 180A for outputting an STO diagnostic signal 170A based on information received from the slave devices 150A-150C. In conformance with modern automation practice, command signals are sent downstream from the master controller 100 to the STO access point 110, which combines them on separate signal wires of the hybrid cable 105A for transmission to slave devices 150A-150C. Similarly, feedback signals are returned from each slave device, which are received by STO access point 110. STO access point removes the STO diagnostic information from the dedicated STO wires and passes the other feedback signals to master controller 100.

Although FIG. 1 shows a single Safe Torque Off command signal 160A being presented to the STO port 190A of the STO access point 110 and a single diagnostic signal 170A being transmitted from STO diagnostic port 180A, it will be recognized that to achieve the very highest levels of safety integrity a second, independent, Safe Torque Off command signal and associated diagnostic signal may be implemented.

Figure 2:
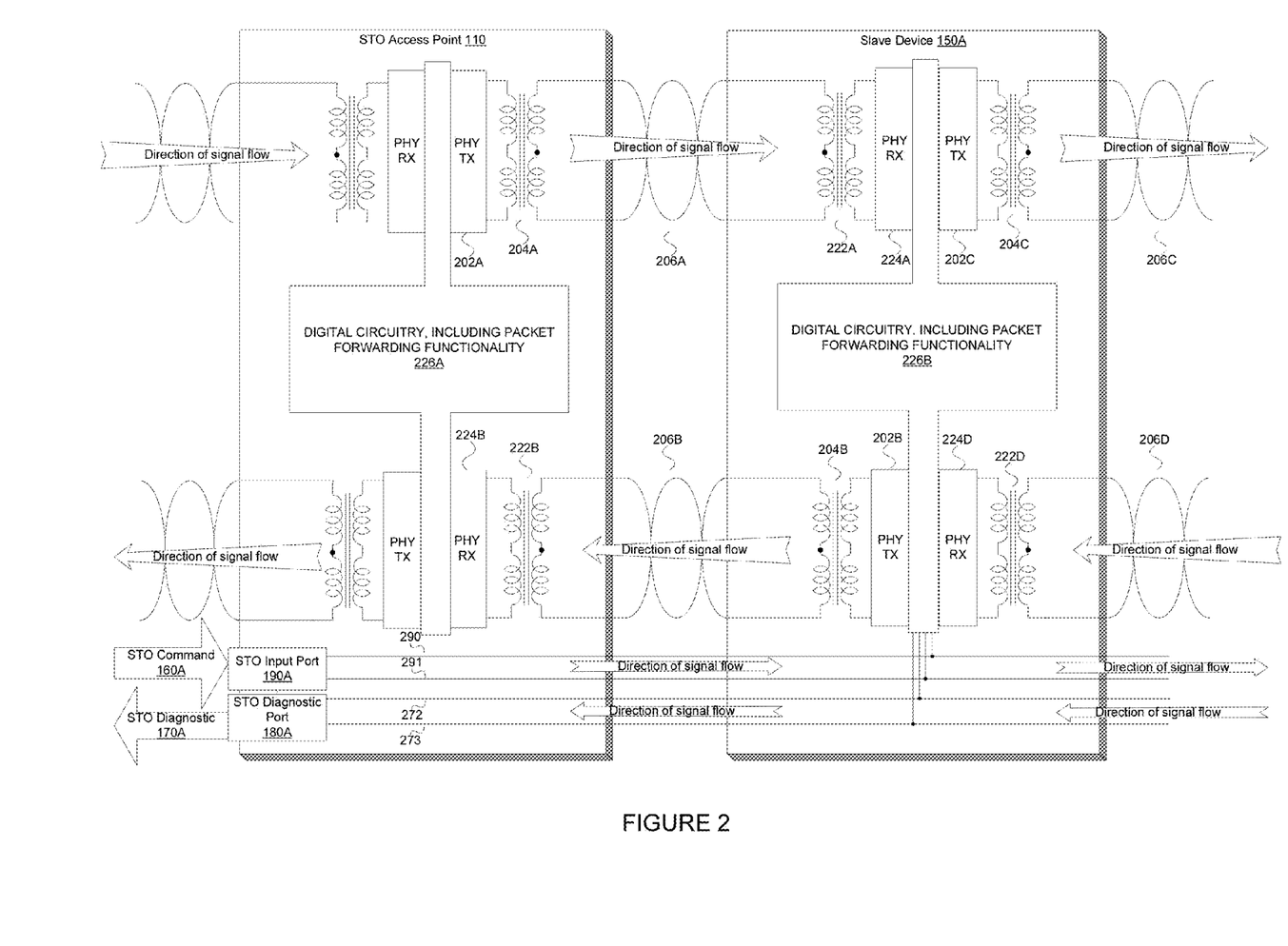
FIG. 2 is a block diagram of the control signal communication in a conventional decentralized drive arrangement.

FIG. 2 is a block diagram of the control signal communication in a conventional decentralized drive arrangement. The network physical layer is of the type where signals are relayed from one slave device to the next adjacent slave device by first receiving the signals from the wires attached to one network port and then re-transmitting the signals to the other network port, an example of such a network physical layer is 100BASE-TX (IEEE 802.3u 1995). Thus, although FIG. 2 and subsequent Figures separately illustrate the upstream and downstream twisted pairs, these twisted pairs will be part of the same wiring set that terminates at a common connector at a common network port. The structure of the network link between any two slave devices is the same, regardless of the function of the slave devices. Each link has a downstream half and an upstream half. In FIG. 2, the downstream half comprises a transmitter circuit 202A, a transmitting isolating transformer 204A, a twisted pair of conductors 206A inside the hybrid cable (any of 105A-105C), a receiving isolating transformer 222A and a receiver circuit 224A. Similarly, in FIG. 2 the upstream half comprises a transmitter circuit 202B, a transmitting isolating transformer 204B, a twisted pair of conductors 206B inside the cable (any of 105A-105C), a receiving isolating transformer 222B and a receiver circuit 224B.

Each link of the network carries the control signal information only as far as the adjacent slave device. In order to allow the information to reach further slave devices, each slave device contains a digital repeater circuit that forwards the network message to the next link. Thus, as illustrated in FIG. 2, slave device 150A includes digital circuit 226B, which forwards the network message from the receiver circuit 224A to transmitter circuit 202C. Similarly, digital circuit 226B forwards network messages received from downstream slave devices by receiver circuit 224D, to transmitter circuit 202B for transmission to STO access point 110.

There may be times when it is necessary to service the machine while it is powered up, and in a machine where any of the slave devices are capable of causing injury, the servicing personnel will require assurance that the motor drive portion of the slave device cannot operate. This assurance is typically provided using a technique referred to as Safe Torque Off (STO, see IEC 61800-5-2). As will be recognized by those skilled in the art, Safe Torque Off represents a demonstrable safety integrity level that the slave motor drive cannot operate, and this safety integrity level is typically certified by governmental authorities or certification entities.

As illustrated in FIG. 2, Safe Torque Off signaling is typically achieved using a separate pair of wires dedicated for this purpose. Specifically, based on STO command 160A, dedicated wires 290 and 291 carry a voltage from Safe Torque Off port 190A in STO access point 110 to the slave devices 150A-150C in the daisy chain. It will be recognized that STO command 160A is typically a DC voltage provided by an external power supply. When no voltage is carried over the dedicated wires then each slave device places itself into the Safe Torque Off state in which the motors are disabled. To enable the motor drives in the daisy chain of slave devices 150A to 150C, a potential must be applied between wires 290 and 291, usual industry practice is to use 24V DC for this purpose.

To reach the highest levels of safety integrity it is necessary to monitor the STO circuit at each slave device and thereby verify that no slave device is enabled. In the language of functional safety this is known as providing Diagnostic Coverage. The usual implementation is to provide a dedicated pair of wires for the STO diagnostic signal (e.g. 272 and 273 in FIG. 2). Where slave devices are connected together so as to share a single STO control line (for example 150A, 150B and 150C in FIG. 1), they can also share a single STO diagnostic signal because if the STO signal issuing from the STO access point 110 is unenergized then all of the slave devices should be disabled (i.e., be in the Safe Torque Off state), and if any of the slaves remains enabled a dangerous condition exists, thus the STO diagnostic signal can be wire-ORed, i.e., logically ORed.

SUMMARY OF THE INVENTION

The power required for the STO signal is typically 1 Watt and with reasonable voltages has a current of approximately 50 mA per slave device, and thus a daisy chain of twenty slave devices requires STO conductors rated for 1 A. By contrast, the current for STO diagnostic signal is a little as 10 mA per daisy chain. Therefore, it can be seen that using discrete conductors for the STO signal carries a much greater penalty in respect of cable size, rigidity and cost than the associated STO diagnostic signal, especially as the STO conductors must be enclosed in a shield to protect against insulation failure of neighboring conductors.

Carrying Safe Torque Off signaling over a dedicated pair of wires from the STO access point to the slave devices increases the cost, size, weight and rigidity of the overall wiring bundle from the STO access point to the slave devices and between each slave device. Accordingly, exemplary embodiments of the present invention address this and other deficiencies of conventional techniques for carrying Safe Torque Off signals by reusing the existing control signal cables. The present invention carries the Safe Torque Off signals at the network physical layer so that it is independent of the network protocol, thus allowing the present invention to be easily implemented in many different types of decentralized drive control arrangements.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 3:
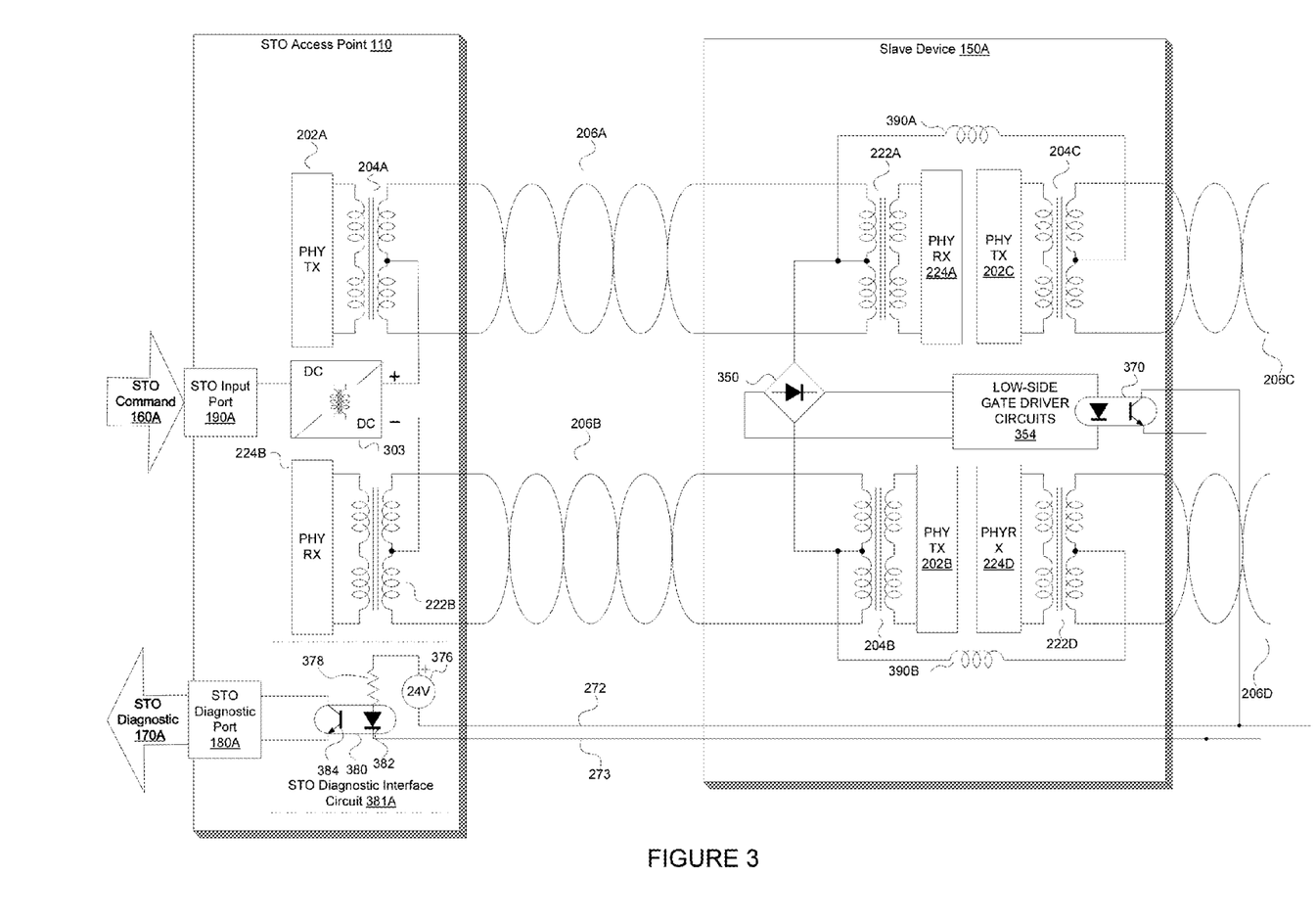
FIG. 3 is a block diagram of a Safe Torque Off command being transmitted by the network cables in accordance with exemplary embodiments of the present invention.

FIG. 3 is a block diagram of a decentralized drive arrangement in accordance with exemplary embodiments of the present invention. The decentralized drive arrangement can be arranged in the manner illustrated in FIG. 1, and also includes similar components to those described above in connection with FIG. 2. Accordingly, elements in FIGS. 2 and 3 with the same reference number will have similar functions.

STO access point 110 includes circuitry 202A and 224B for sending and receiving control signals to/from slave devices using a communications network. The arrangement in FIG. 3 further provides the Safe Torque Off signal by applying an isolated direct current (DC) signal in a differential manner between the downstream twisted pair 206A and the upstream twisted pair 206B. Specifically, a DC voltage source is applied to the center taps of the output side of transformer 204A and the input side of transformer 222B. This DC voltage is carried over twisted pairs 206A and 206B and is accessed at the input side of transformer 222A before receiver 224A and at the output side of transformer 204B, after transmitter 202B. Specifically, bridge rectifier 350 is coupled to the center tap at the input side of transformer 222A and the output side of transformer 204B to pass the DC voltage to the low side gate driver circuit 354 which, if not energized, activates the Safe Torque Off state. It should be recognized that bridge rectifier 350 ensures consistent polarity. Low-side gate driver circuits 354 can be arranged in a similar manner to that illustrated in FIG. 4, which will be described in more detail below.

The Safe Torque Off signal is passed to subsequent slaves through filters 390A and 390B. Specifically, filter 390A is coupled to the center tap of the input winding of transformer 222A, and to the center tap of the output winding of transformer 204C, and likewise filter 390B is coupled to the center tap of the input winding of transformer 222D, and to the center tap of the output winding of transformer 204B. The filters have a low-pass characteristic and they block high frequency signals, such as interference, but allow the low frequency Safe Torque Off signal to pass unimpeded. Accordingly, the Safe Torque Off signal is then passed over twisted pairs 206C and 206D to the next slave device in the daisy chain. It should be recognized that filters 390A and 390B are only included to enhance electromagnetic compatibility (EMC), and that the center tap of 222A could be connected directly to the center tap of 204C and the center tap of 204B could be connected directly to the center tap of 222D. It should be further recognized that filters 390A and 390B could be embodied in a single component such as a common mode filter.

Because the DC voltage is supplied as common mode voltage to each of twisted pairs 206A and 206B it does not appear as a signal across the input winding of transformers 222A and 222B and is therefore not presented to receiver 224A and 224B, respectively. Thus, the Safe Torque Off signal does not interfere with the upstream and downstream control signals being carried over these twisted pairs.

The arrangement of FIG. 3 also provides a diagnostic feedback signal to the STO access point indicating whether Safe Torque Off is disabled. Specifically, photocoupler 370 is energized (namely the input photo-diode is conducting and the output transistor 384 is also conducting) and thus allows current to flow out of voltage source 376 into resistor 378, out of resistor 378, into the photo-diode 382 of photocoupler 380 returning via the transistor of photocoupler 370. The transistor 384 of photocoupler 380 allows current to flow in the diagnostic signal 170A which is external to the STO access point 110.

It should be recognized that rectifier 350 is provided in case DC power supply 303 is connected in an opposite fashion from that illustrated in FIG. 3, for example by mis-wiring cables 206A and 206B, and can be omitted. Although not illustrated in FIG. 3, it should be recognized that slave device 150A includes similar digital circuitry and packet forwarding functions between the transmitters and receivers to that described above in connection with FIG. 2.

Figure 4:
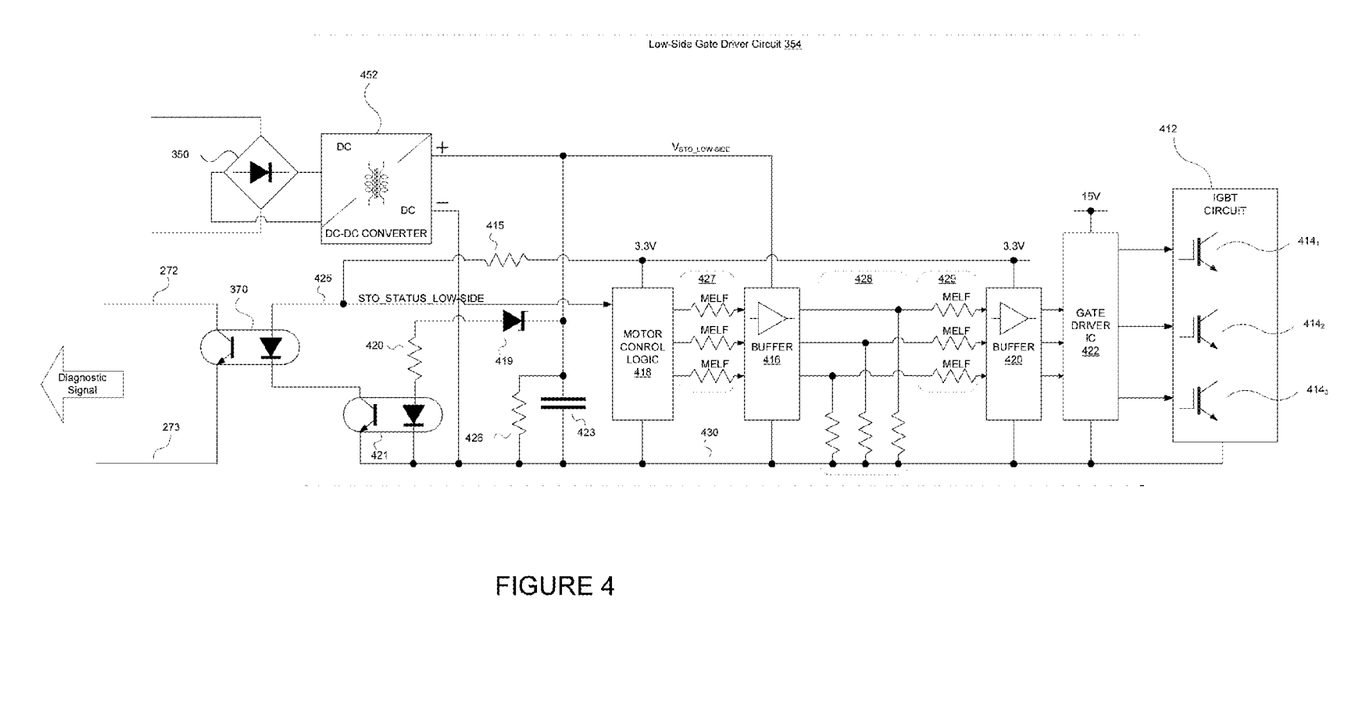
FIG. 4 is a circuit diagram of low-side gate driver circuit incorporating Safe Torque Off in accordance with exemplary embodiments of the present invention.

FIG. 4 is a circuit diagram of the gate driver circuit 354 of FIG. 3. Element 452 is an isolating DC-DC converter, the input on the left hand side is powered by the STO signal via rectifier 350. The negative output terminal of DC-DC converter 452 is connected to the local 0V rail 430. The positive output terminal of DC-DC converter 452 creates a local supply rail $V_{STO\_LOW\text{-}SIDE}$ across capacitor 423. Resistor 426 ensures that when the input side of DC-DC converter 452 ceases to be excited, DC supply rail $V_{STO\_LOW\text{-}SIDE}$ across capacitor 423 will decay to an inactive level within a pre-determined time interval. When the motor is being operated, pulse width modulated (PWM) control signals are sent from the motor control logic 418 via resistor array 427 to a three-channel buffer 416, which in turn drives three-channel buffer 420 via resistor array 428 and resistor array 429. The signals from the motor control logic thus arrive at the gate driver IC 422 thus turning on low-side IGBTs $414_1$, $414_2$, $414_3$ respectively in IGBT module 412. When the input side of DC-DC converter 452 ceases to be excited, the supply voltage $V_{STO\_LOW\text{-}SIDE}$ decays to zero and consequently the buffer 416 is unpowered. Resistor array 428 ensures that buffer 420 is presented with logic low, and therefore that gate driver IC 422 turns off low-side IGBTS $414_1$, $414_2$, $414_3$, thus ensuring that the motor cannot be driven. Resistor arrays 427 and 429 ensure that the motor control logic cannot power buffer 416 when rail $V_{STO\_LOW\text{-}SIDE}$ is off Resistor arrays 427 and 429 have a Metal Electrode Leadless Face (MELF) construction, which provides high reliability against failing in a short-circuited condition, in this circuit that would be a dangerous failure condition.

A second aspect of low-side gate driver circuit 354 is the diagnostic function: when DC supply rail $V_{STO\_LOW\text{-}SIDE}$ across capacitor 423 is established the circuit is not in the Safe Torque Off state and current flows from the $V_{STO\_LOW\text{-}SIDE}$ rail through Zener diode 419, resistor 420 and the photo-diode of photocoupler 421, which in turn causes current to flow from the 3.3V DC supply rail via resistor 415 and the photo-diode of photocoupler 370 and the photo-transistor of photocoupler 421, which in turn allows to current to flow in wires 272 and 273. It is useful for the motor control logic 418 (such as an ASIC, FPGA or Microcontroller) to monitor the STO diagnostic signal so that the signal for each slave can be examined by the master controller 100 via the network so that the slave device or slave devices that are not in the safe torque of state can be determined. To achieve this goal, signal 425 called STO_STATUS_LOW-SIDE is presented to the motor control logic 418, which in turn is connected to the network via other circuitry 226B (connection not shown in FIG. 3 or 4). In summary, exciting DC-DC converter 452 enables low-side IGBTS $414_1$, $414_2$, $414_3$ to be driven and allows a diagnostic current to flow in wires 272 and 273.

Figure 5:
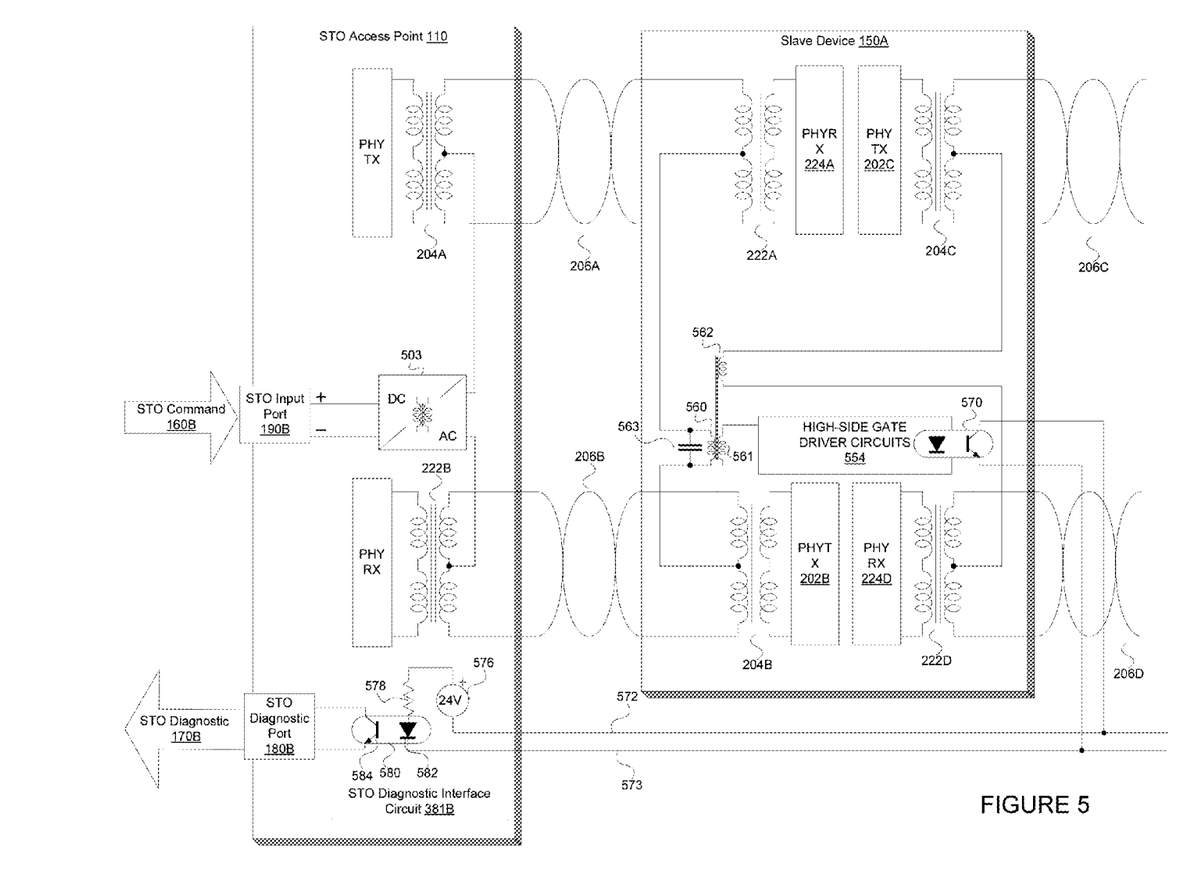
FIG. 5 is a block diagram of an alternative scheme for a Safe Torque Off command being transmitted using alternating current by the network cables in accordance with exemplary embodiments of the present invention.

FIG. 5 is a block diagram of another decentralized drive arrangement in accordance with exemplary embodiments of the present invention. This decentralized drive arrangement uses an alternating current (AC) voltage source to provide the Safe Torque Off signal. Specifically, a DC voltage source is supplied to DC-AC inverter 503, which applies an AC voltage to the center tap of the output side of transformer 204A and to the center tap of the input side of transformer 222B.

The AC voltage is carried over twisted pairs 206A and 206B and is accessed at the center tap of the input side of transformer 222A before receiver 224A, and the center tap of output side of transformer 204B, after transmitter 202B. Specifically, transformer primary 560 is connected between said center taps. Transformer output winding 561 is coupled to high-side gate driver circuit 554. High-side gate driver circuits 554 can be arranged in a similar manner to that illustrated in FIG. 6, which will be described in more detail below. Because the AC voltage is impressed as a common mode signal to twisted pair 206A and also to twisted pair 206B, it therefore does not appear across the windings of transformers 222A and 222B, and accordingly the Safe Torque Off signal does not interfere with the upstream and downstream control signals being carried over these twisted pairs.

Optionally, a capacitor 563 can be fitted across the transformer primary winding 560 (or alternatively output winding 561 or output winding 562) that is sized to improve the power factor of the AC Safe Torque Off signal flowing from inverter 503.

A third transformer winding 562 passes the Safe Torque Off signal to downstream slave devices. Specifically, winding 562 is coupled to the center tap of the output winding of transformer 204C after transmitter 202C, and to the center tap of the input winding of transformer 222D before receiver 224D. Accordingly, the Safe Torque Off signal is then passed over twisted pairs 206C and 206D to the next slave device in the daisy chain.

As an alternative to passing the AC signal to downstream devices using tertiary transformer winding 562, it is equally practicable to connect the center tap of transformer 222A to center tap of transformer 204C and to connect the center tap of transformer 204B to center tap of transformer 222D, said connections can be direct or they can be like those of FIG. 3 where filters 390A and 390B make the connection.

The arrangement in FIG. 5 includes a diagnostic feedback signal that operates in a similar manner to that of the arrangement in FIG. 3, and accordingly a detailed description of the elements providing the feedback signal will not be repeated. Additionally, although not illustrated in FIG. 5, the arrangement includes similar control circuitry at the STO access point and at the slave device to those described above in connection with FIG. 2.

Figure 6:
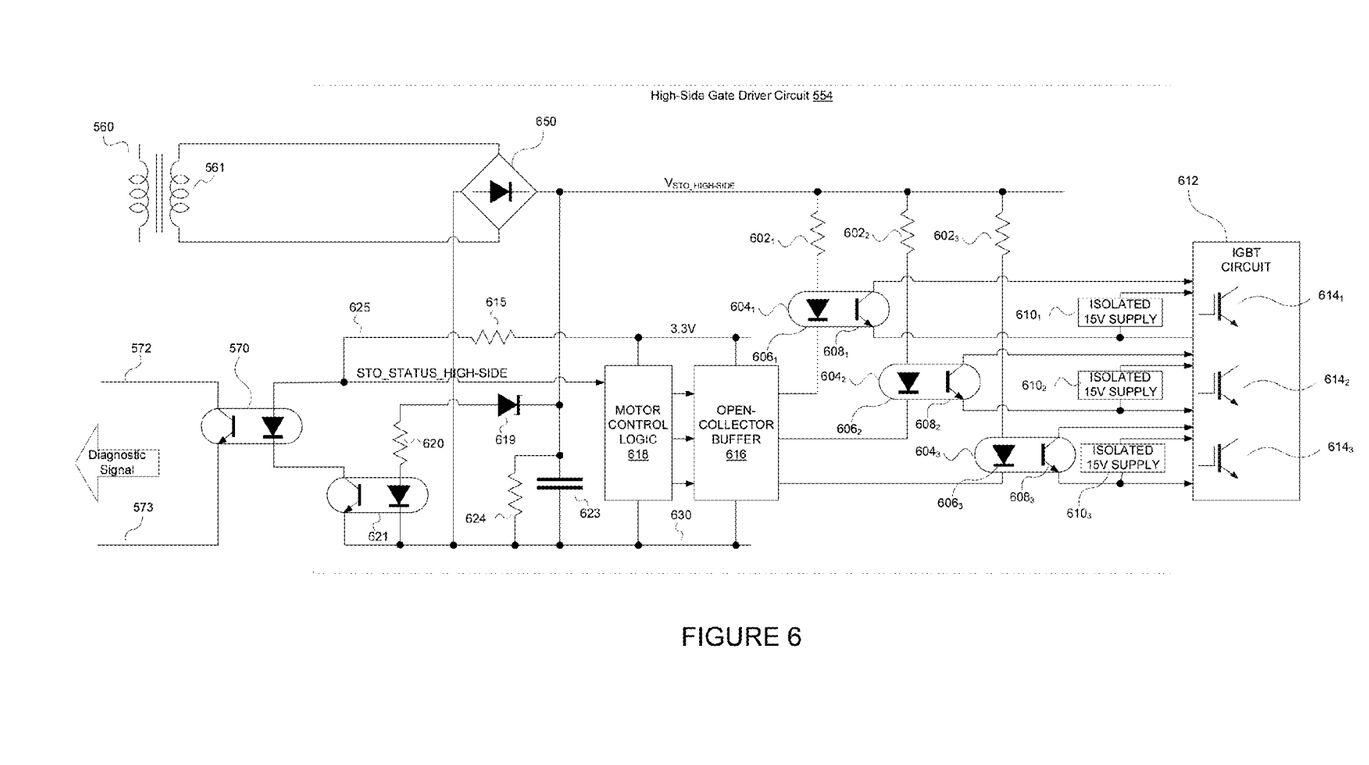
FIG. 6 is a circuit diagram of a high-side gate driver circuit incorporating Safe Torque Off in accordance with exemplary embodiments of the present invention.

FIG. 6 is a circuit diagram of high-side gate driver circuit 654 in accordance with exemplary embodiments of the present invention. When the transformer primary winding 560 is presented with an AC signal, a corresponding AC signal will appear across secondary winding 561. This signal is rectified by rectifier 650 to establish a DC supply rail $V_{STO\_HIGH\text{-}SIDE}$ across capacitor 623. Resistor 624 ensures that when winding 560 ceases to be excited, DC supply rail $V_{STO\_HIGH\text{-}SIDE}$ across capacitor 623 will decay to an inactive level within a pre-determined time interval. When the motor is being operated, PWM control signals are sent from the motor control logic 618 (such as an ASIC, FPGA or Microcontroller) to three-channel open collector buffer 616, which causes corresponding currents to flow in the photo diodes $606_1$, $606_2$, $606_3$ and resistors $602_1$, $602_2$, $602_3$. This turns-on the photocouplers' output transistors $608_1$, $608_2$, $608_3$, respectively, and thus turns-on IGBTs $614_1$, $614_2$, $614_3$, respectively, in IGBT module 612 in combination with isolated 15V supplies $610_1$, $610_2$, $610_3$. When the winding 560 is not driven, the supply voltage $V_{STO\_HIGH-SIDE}$ decays to zero and no current flows in resistors $602_1$, $602_2$, $602_3$ thereby turning off all of the high side IGBTS $614_1$, $614_2$, $614_3$ thus ensuring that the motor cannot be driven. A second aspect of low-side gate driver circuit 554 is the diagnostic function which is identical to that of FIG. 4 and will therefore not be described further. In summary, exciting transformer primary 560 enables the high side IGBTS $614_1$, $614_2$, $614_3$ to be driven and allows a diagnostic current to flow in wires 572 and 573.

Figure 7:
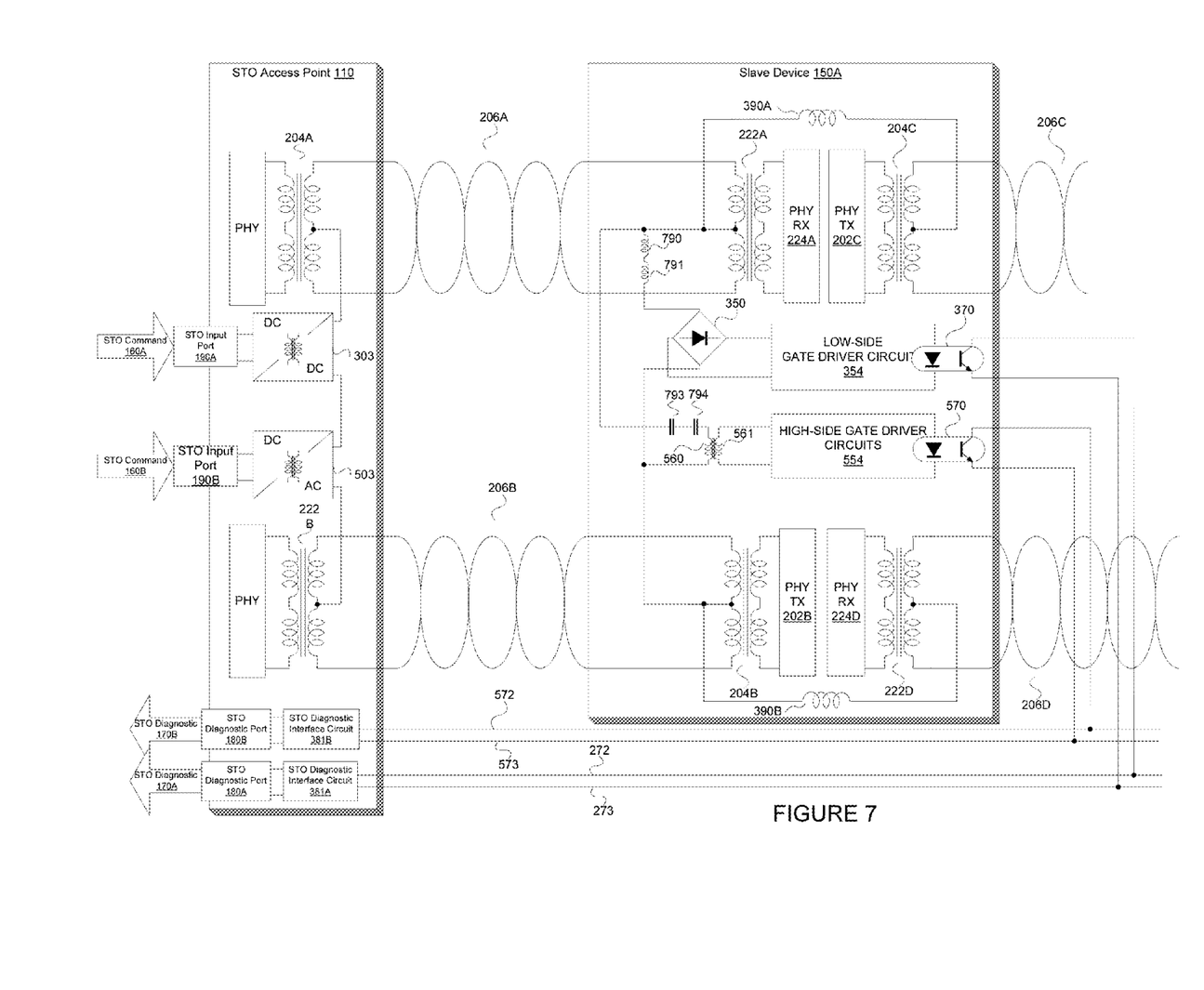
FIG. 7 is a block diagram of two Safe Torque Off commands being transmitted by the network cables as a DC voltage and as an AC voltage in accordance with exemplary embodiments of the present invention.

FIG. 7 is a block diagram of another decentralized drive arrangement in accordance with exemplary embodiments of the present invention. This arrangement provides two Safe Torque Off signals to each of the slave devices, one signal uses AC and the other signal uses DC. Specifically, the first STO command signal 160A supplies DC-DC converter 303, which is coupled to the center tap of the output winding of transformer 204A and to DC-AC inverter 503. The second STO command signal 160B supplies DC-AC inverter 503, which is coupled to the center tap of the output winding of transformer 222B and to the output of DC-DC converter 303. It will be recognized that like STO command signal 160A, STO command signal 160B is a DC voltage generated from an external power supply. This arrangement creates a composite Safe Torque Off signal with both an AC and DC component that controls the voltage difference between the common mode voltage of twisted pair 206A and the common mode voltage of twisted pair 206B. Neither twisted pair will experience a differential signal arising from the AC and DC Safe Torque Off signals, and thus the network signaling will not be disturbed.

The AC and DC Safe Torque Off signals are accessed at slave device 150A, passed to the device's gate driver circuits and to the next slave device. Specifically, for the DC Safe Torque Off signal, rectifier 350 is coupled to the center tap of the output winding of transformer 204B and the center tap of the input winding of transformer 222B. In order to remove the AC component, rectifier 350 is coupled in series to a pair of inductors 790 and 791. The other input of bridge rectifier 350 is returned to the center-tap of transformer 204B. The output of bridge rectifier 350 is passed to low-side gate driver circuits 354. Gate driver circuits 354 can be arranged in a similar manner to that illustrated in FIG. 4. Gate driver circuits 354 employ photocoupler 370 to pass a diagnostic signal back to STO diagnostic circuit 381A via wires 272 and 273.

For the AC Safe Torque Off signal, transformer 560 is coupled directly to the center tap of the output winding of transformer 204B and is connected via DC blocking capacitors 793 and 794 to the center tap of the input winding of transformer 222A. Transformer winding 560 is coupled to the high-side gate driver circuits 554 via transformer winding secondary winding 561. High-side gate driver circuits 554 can be arranged in a similar manner to that illustrated in FIG. 6. Gate driver circuits 554 employ photocoupler 570 to pass a diagnostic signal back to STO diagnostic circuit 381B via wires 572 and 573. Additionally, although not illustrated in FIG. 7, the arrangement includes similar control circuitry at the STO access point and at the slave device to those described above in connection with FIG. 2. The AC and DC Safe Torque Off signals are passed to the next slave via filters 390A and 390B in the same manner as FIG. 3.

Although FIG. 7 illustrates two blocking capacitors 793 and 794 in series to improve reliability, the present invention can be implemented with just one capacitor or more than two capacitors. Additionally, although FIG. 7 illustrates two blocking inductors 790 and 791 in series to improve reliability, the present invention can be implemented with just one inductor or more than two inductors would also work. It should be recognized that using inductors 790 and 791 is merely one way of canceling the AC component from the DC path and that other techniques can be applied to achieve the same result.

Although FIGS. 5 and 7 illustrate the AC STO signal accomplishing Safe Torque Off using the high side gate driver circuit 554 of FIG. 6, low side gate driver circuit 354 of FIG. 4 could have been used instead. Similarly, although FIGS. 3 and 7 illustrate using the DC STO signal to accomplish Safe Torque Off using the low side gate driver circuit 354, the high side gate driver circuit 554 as described in FIG. 6 could have been used instead.

Although not specifically illustrated in the figures above, it should be recognized that the master controller and slave devices include a network interface that transmits to and receives from the two twisted pairs. This interface can be, for example, an Ethernet interface. Thus, as described above, the twisted pairs would terminate at a single Ethernet connector at each terminating side of the twisted pairs.

In FIGS. 3, 5 and 7 the STO signal or signals are connected at the center-taps of the twisted pairs to provide a balanced displacement to ground, and therefore the best electromagnetic compatibility (EMC). It is alternatively possible to connect to say the lower end of the transformers 204A and 222A.

Figure 8:
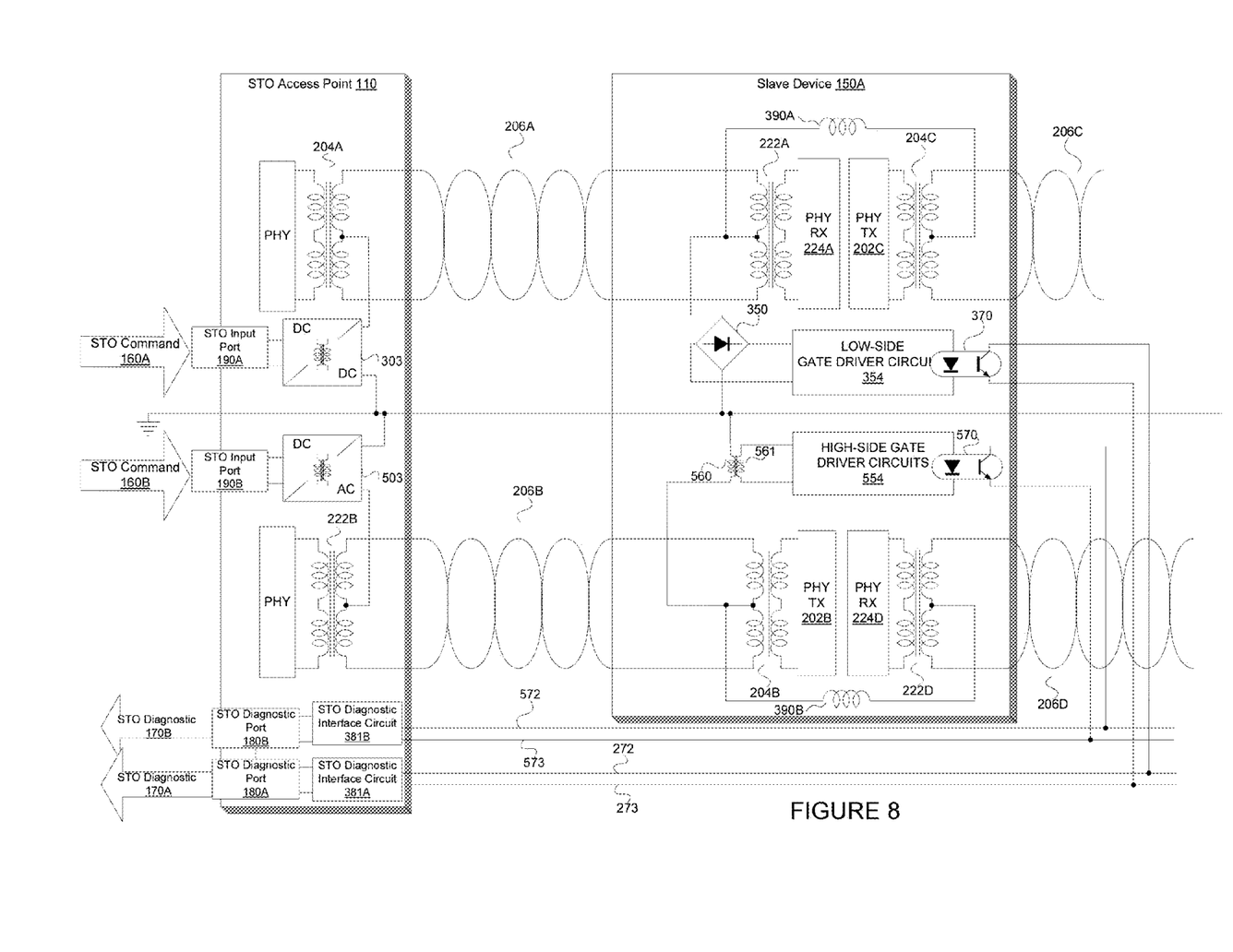
FIG. 8 is a block diagram of two Safe Torque Off commands being transmitted by the network cables as a DC voltage and as an AC voltage as a common mode signal relative to a reference potential in accordance with exemplary embodiments of the present invention.

In FIGS. 3, 5 and 7 the STO signal or signals have been applied between the twisted pairs as this allows the twisted pairs to float with respect to ground and thus confers the best immunity to common mode interference. It is alternatively possible to apply the STO signal as a common mode signal relative to a reference potential such as ground, this is illustrated in FIG. 8 which in all other respects is identical to FIG. 7. Applying the common mode signal relative to a reference potential allows the AC and DC STO signals to be used in networks that have just one twisted pair such as an RS-485 multi-drop network.

The STO access point functionality, namely the point at which the STO signal or signals are supplied to the network and from which the STO diagnostic signal or signals are provided, can be embodied in a distinct network node or can combined with other functions; for example be within the master controller or within a slave device.

The Safe Torque Off techniques of the present invention can also be employed with the powering technique disclosed in U.S. patent application Ser. No. 13/214,500 entitled "Power Source to Remote Drive Interconnection Scheme", filed Aug. 22, 2011 the entire disclosure of which is herein expressly incorporated by reference.

By reusing the twisted pair wires used for control signaling between the STO access point and slave devices to carry a Safe Torque Off signal, the present invention reduces the number of wires and the associated expenses compared to conventional techniques that employ separate wires to carry the Safe Torque Off signal. Additionally, by providing the Safe Torque Off signal at the physical layer, the Safe Torque Off signaling of the present invention is network protocol agnostic, which allows the present invention to be easily implemented in many different types of decentralized drive control arrangements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system comprising:
a master controller;
a first slave motor drive coupled to the STO access point via the network; and
a Safe Torque Off (STO) access point coupled to the master controller and the first slave motor drive via a network, wherein the STO access point includes
a first and second physical interface coupled to the first slave motor drive;
a first transformer coupled to the first physical interface and a second transformer coupled to the second physical interface, wherein a power source is coupled to an output winding of the first transformer and an input winding of the second transformer; and
a network interface coupled to the output winding of the first transformer and the input winding of the second transformer and connectable to the first slave motor drive, via the network, to supply power from the power source to the slave motor drive,
wherein power supplied by the power source is a Safe Torque Off signal.

2. The system of claim 1, wherein the power source is a direct current power source external to the master controller.

3. The system of claim 2, wherein the power supplied to the first slave motor drive is direct current power.

4. The system of claim 2, wherein the power supplied to the first slave motor drive is alternating current power and the STO access point further comprises a direct current-to-alternating current inverter coupling the power source to the output windings of the first and second transformers.

5. The system of claim 4, wherein the first slave motor drive includes a receiving transformer coupled to a receiver and a transmitting transformer coupled to a transmitter, wherein the first slave motor drive includes a capacitor coupled to the receiving and transmitting transformers, and wherein the capacitor is sized to control a power factor of the alternating current power supplied to the first slave motor drive.

6. The system of claim 1, wherein the system includes a second slave motor drive, the first slave motor drive includes a first transmission and reception transformer and a second transmission and reception transformers, and the Safe Torque Off signal is passed from to the first reception transformer to the first transmission transformer via a first filter and the Safe Torque Off signal is passed from the second transmission transformer to the second reception transformer via a second filter.

7. The system of claim 1, wherein the system includes a second slave motor drive, the first slave motor drive includes a first transmission and reception transformer and a second transmission and reception transformers, and the Safe Torque Off signal is passed from to the first reception transformer to the first transmission transformer via a common mode filter and the Safe Torque Off signal is passed from the second transmission transformer to the second reception transformer via the common mode filter.

8. The system of claim 1, wherein the system includes a second slave motor drive, the first slave motor drive includes a first transmission and reception transformer and a second transmission and reception transformers, and the Safe Torque Off signal is passed from to the first reception transformer to the first transmission transformer via a first output winding of a third transformer and the Safe Torque Off signal is passed from the second transmission transformer to the second reception transformer via a second output winding of the third transformer.

9. The system of claim 1, wherein the power supplied to the one or more slave motor drives is direct current and alternating current power, the STO access point further comprising:
a direct current-to-direct current converter coupled to a first direct current power source;
a direct current-to-alternating current inverter coupled to a second direct current power source,
wherein one output of the direct current-to-direct current converter is coupled to the output winding of the first transformer and a second output of the direct current-to-direct current converter is coupled to an output of the direct current-to-alternating current inverter, and
wherein a second output of the direct current-to-alternating current inverter is coupled to the input winding of the second transformer.

10. The system of claim 1, wherein the power supplied to the one or more slave motor drives is direct current and alternating current power, the STO access point further comprising:
a direct current-to-direct current converter coupled to a first direct current power source;
a direct current-to-alternating current inverter coupled to a second direct current power source,
wherein one output of the direct current-to-direct current converter is coupled to the output winding of the first transformer and a second output of the direct current-to-direct current converter is coupled ground, and
wherein a first output of the direct current-to-alternating current inverter is coupled to ground and a second output is connected to the input winding of the second transformer.

11. A slave motor drive, comprising:
a first transformer coupled to a first physical interface;
a second transformer coupled to a second physical interface;
a component coupled to a center tap of an input winding of the first transformer and to a center tap of an output winding of the second transformer; and
Safe Torque Off circuitry, coupled to the component, that controls whether power is supplied to a motor drive of the slave motor drive,
wherein the component removes an incoming Safe Torque Off voltage from the first and second transformers and supplies the removed incoming voltage to the Safe Torque Off circuitry.

12. The slave motor drive of claim 11, wherein the incoming voltage is a direct current voltage.

13. The slave motor drive of claim 12, wherein the component is a rectifier that is coupled to the Safe Torque Off circuitry via a direct current to direct current converter.

14. The slave motor drive of claim 11, wherein the incoming voltage is an alternating current voltage.

15. The slave motor drive of claim 14, wherein the component is a transformer coupled to the Safe Torque Off circuitry via a rectifier.

16. The slave motor drive of claim 11, wherein the incoming voltage includes direct current and alternating current voltage.

17. The slave motor drive of claim 16, wherein the safe torque of circuitry includes a direct current Safe Torque Off circuitry and an alternating current Safe Torque Off circuitry, the component includes a direct current component coupled to the direct current Safe Torque Off circuitry and an alternating current component coupled to the alternating current Safe Torque Off circuitry.

18. The slave motor drive of claim 17, wherein the direct current component includes a rectifier coupled in parallel to a capacitor and to the center tap of the input winding of the first transformer and to the center tap of the output winding of the second transformer.

19. The slave motor drive of claim 17, wherein the alternating current circuitry includes a transformer coupled in series with a pair of capacitors to the center tap of the input winding of the first transformer and coupled to the center tap of the output winding of the second transformer.

\* \* \* \* \*